June 20, 1961 W. H. P. POULIART ET AL 2,989,236

BI-QUINARY MULTIPLICATION DEVICE

Filed Feb. 13, 1956 11 Sheets-Sheet 1

Inventors
W. H. P. POULIART-
J. P. H. VANDEVENNE
By Robert Harding Jr
Attorney

Inventors
W. H. P. POULIART-
J. P. H. VANDEVENNE
By Robert Harding Jr.
Attorney

June 20, 1961 W. H. P. POULIART ET AL 2,989,236

BI-QUINARY MULTIPLICATION DEVICE

Filed Feb. 13, 1956 11 Sheets-Sheet 3

Inventors
W. H. P. POULIART-
J. P. H. VANDEVENNE
By Robert Harding Jr.
Attorney

June 20, 1961 W. H. P. POULIART ET AL 2,989,236

BI-QUINARY MULTIPLICATION DEVICE

Filed Feb. 13, 1956 11 Sheets-Sheet 4

Inventors
W. H. P. POULIART
J. P. H. VANDEVENNE
By Robert Harding Jr.
Attorney

Inventors
W. H. P. POULIART-
J. P. H. VANDEVENNE
By Robert Harding Jr.
Attorney

Inventors
W H P POULIART
J P H VANDEVENNE
By [signature]
Attorney

Inventors
W. H. P. POULIART-
J. P. H. VANDEVENNE
By Robert Harding Jr.
Attorney

June 20, 1961 W. H. P. POULIART ET AL 2,989,236

BI-QUINARY MULTIPLICATION DEVICE

Filed Feb. 13, 1956 11 Sheets-Sheet 8

Inventors
W. H. P. POULIART
J. P. H. VANDEVENNE
By Robert Harding Jr
Attorney

Inventors
W. H. P. POULIART
J. P. H. VANDEVENNE
By Robert Harding Jr
Attorney

BI-QUINARY MULTIPLICATION DEVICE

Filed Feb. 13, 1956 11 Sheets-Sheet 10

FIG. 11.

A'B'

| B' \ A' | 0 | 1 | 2 | 3 | 4 |
|---|---|---|---|---|---|
| 0 | 0 | 0 | 0 | 0 | 0 |
| 1 | | 1 | 2 | 3 | 4 |
| 2 | | | 4 | 6 | 8 |
| 3 | | | | 9 | 12 |
| 4 | | | | | 16 |

FIG. 12.

U'=A'B' MOD.5

| B' \ A' | 0 | 1 | 2 | 3 | 4 |
|---|---|---|---|---|---|
| 0 | 0 | 0 | 0 | 0 | 0 |
| 1 | | 1 | 2 | 3 | 4 |
| 2 | | | 4 | 1 | 3 |
| 3 | | | | 4 | 2 |
| 4 | | | | | 1 |

U

| B | B' \ A: | 0 | | | | | 1 | | | | |
|---|---|---|---|---|---|---|---|---|---|---|---|
| | A' | 0 | 1 | 2 | 3 | 4 | 0 | 1 | 2 | 3 | 4 |
| 0 | 0 | 0 | 0 | 0 | 0 | 0 | 0 | 0 | 0 | 0 | 0 |
| | 1 | | 0 | 0 | 0 | 0 | 1 | 1 | 1 | 1 | 1 |
| | 2 | | | 0 | 1 | 1 | 0 | 0 | 0 | 1 | 1 |
| | 3 | | | | 1 | 0 | 1 | 1 | 0 | 0 | 1 |
| | 4 | | | | | 1 | 0 | 0 | 1 | 0 | 1 |
| 1 | 0 | | | | | | 1 | 0 | 1 | 0 | 1 |
| | 1 | | | | | | | 1 | 0 | 1 | 0 |
| | 2 | | | | | | | | 1 | 1 | 0 |
| | 3 | | | | | | | | | 0 | 0 |
| | 4 | | | | | | | | | | 0 |

FIG. 13.

5D + D'

| B | B' \ A: | 0 | | | | | 1 | | | | |
|---|---|---|---|---|---|---|---|---|---|---|---|
| | A' | 0 | 1 | 2 | 3 | 4 | 0 | 1 | 2 | 3 | 4 |
| 0 | 0 | 0 | 0 | 0 | 0 | 0 | 0 | 0 | 0 | 0 | 0 |
| | 1 | | 0 | 0 | 0 | 0 | 0 | 0 | 0 | 0 | 0 |
| | 2 | | | 0 | 0 | 0 | 1 | 1 | 1 | 1 | 1 |
| | 3 | | | | 0 | 1 | 1 | 1 | 2 | 2 | 2 |
| | 4 | | | | | 1 | 2 | 2 | 2 | 3 | 3 |
| 1 | 0 | | | | | | 2 | 3 | 3 | 4 | 4 |
| | 1 | | | | | | | 3 | 4 | 4 | 5 |
| | 2 | | | | | | | | 4 | 5 | 6 |
| | 3 | | | | | | | | | 6 | 7 |
| | 4 | | | | | | | | | | 8 |

FIG. 14.

Inventors
W. H. P. POULIART
J. P. H. VANDEVENNE
By Robert Harding Jr.
Attorney

BI-QUINARY MULTIPLICATION DEVICE
Filed Feb. 13, 1956 11 Sheets-Sheet 11
FIG. 15.
| CR | 0 | 1 | 2 | 3 | 4 |
|---|---|---|---|---|---|
| 0 | 0 | 0 | 0 | 0 | 0 |
| 1 | | 0 | 0 | 0 | 1 |
| 2 | | | 0 | 1 | 1 |
| 3 | | | | 1 | 1 |
| 4 | | | | | 1 |
FIG. 16.
| CR | 0 | 1 | 2 | 3 | 4 |
|---|---|---|---|---|---|
| 0 | 0 | 1 | 2 | 3 | 4 |
| 1 | | 2 | 3 | 4 | 0 |
| 2 | | | 4 | 0 | 1 |
| 3 | | | | 1 | 2 |
| 4 | | | | | 3 |
FIG. 17.
| CR | 0 | 1 | 2 | 3 | 4 |
|---|---|---|---|---|---|
| 0 | 0 | 0 | 0 | 1 | 1 |
| 1 | | 0 | 1 | 1 | 0 |
| 2 | | | 1 | 0 | 0 |
| 3 | | | | 0 | 0 |
| 4 | | | | | |
FIG. 18.
| CR | 0 | 1 | 2 | 3 | 4 |
|---|---|---|---|---|---|
| 0 | 0 | 0 | 1 | 0 | 0 |
| 1 | | 1 | 0 | 0 | 0 |
| 3 | | | 0 | 0 | 0 |
| 3 | | | | 0 | 1 |
| 4 | | | | | 0 |
FIG. 19.
| CR | 0 | 1 | 2 | 3 | 4 |
|---|---|---|---|---|---|
| 0 | 0 | 1 | 0 | 1 | 0 |
| 1 | | 0 | 1 | 0 | 0 |
| 2 | | | 0 | 0 | 1 |
| 3 | | | | 1 | 0 |
| 4 | | | | | 1 |
FIG. 20.
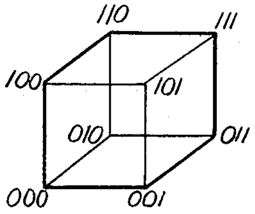
FIG. 21.
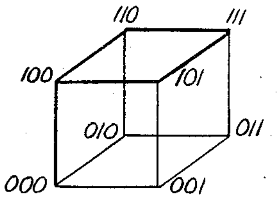
Inventors
W. H. P. POULIART-
J. P. H. VANDEVENNE
By [signature]
Attorney

United States Patent Office 2,989,236

Patented June 20, 1961

2,989,236

BI-QUINARY MULTIPLICATION DEVICE

Willy Hortense Prosper Pouliart, Berchem-Antwerp, and Jean Pierre Henri Vandevenne, Brussels, Belgium, assignors to International Standard Electric Corporation, New York, N.Y., a corporation of Delaware Filed Feb. 13, 1956, Ser. No. 565,232
Claims priority, application Belgium Feb. 12, 1955
2 Claims. (Cl. 235—159)

The present invention relates to an electrical computer. More particularly, it relates to a calculating table matrix intended to form the basic arithmetical element in a universal computer. Of course, the invention can also be used for other purposes and particularly for computers of a commercial type, for example machines for the automatization of industrial bookkeeping.

An object of the invention is to provide a calculating table matrix of a new type and permitting high operating speeds by using a limited equipment.

Another object of the invention resides in the use of a particular code, adapted to the representation of digits of a decimal system according to an individual binary coding for each digit, enabling an identification of each particular code by means of a restricted number of elements, and also permitting taking the complement, useful for subtraction, by means of a limited equipment.

Another object of the invention resides in the realization of a multiplication table matrix of two digits which is particularly advantageous because of the limited number of elements used and the speed of its operation.

According to the first characteristic of the invention, the calculating table matrix is conceived in order to be able to operate on four digits with a view to accomplish the operation $(A\times B)+C+R$.

According to another characteristic of the invention, the calculating table matrix is arranged in such a way that the operations $A\times B$ and $C+R$ are accomplished in parallel.

According to another characteristic of the invention, the digit B may be rendered equal to 1, permitting in that way additions.

According to another characteristic of the invention, the application of the digit C to the calculating table matrix can be made by means of a circuit for taking the complement, which, in the case of B being equal to 1, will permit the subtraction operation.

According to another characteristic of the invention, the code used for the representation of decimal digits by a binary coding decimal system, is of the biquinary type, one out of four binary digits used for the representation of each decimal digit having a weight of five, whereas the three other digits define by five different combinations, the quinary part of the decimal digit. The code, as represented further on, permits the recognition of each combination of four binary digits by means of a minimum number of elements. It permits obtaining the complement to 9 of a decimal digit by reversing only two columns. Besides, it avoids the code 1111 which may be advantageous from a viewpoint of limiting the necessary power. It avoids also, when a succession of decimal digits each represented by a binary code of four elements are aligned in series, a succession of more than three adjacent binary digits of same value. This last point has already been explained in application of W. Pouliart, Serial No. 411,523, filed February 19, 1954, and is advantageous in relation to registering in magnetic memories such as drum memories.

According to another characteristic of the invention, the digits A, B, C and R are delivered to the calculating table matrix in the form of a 4-digit code of the type mentioned above, i.e. comprising a binary part and a quinary part.

According to another characteristic of the invention, the multiplication table matrix of the digits A and B is decomposed into three table matrices in order to limit the apparatus.

According to another characteristic of the invention, two addition table matrices are used, of which the first operates on the input digits C and R whereas the second operates on the result of the first addition table matrix as well as on the result of the multiplication table matrix.

According to another characteristic of the invention, only two carry table matrices are used, the first being fed by the carry of the second addition table matrix and by a part of the carry the multiplication table matrix, whereas the second is fed by the carry of the first carry table matrix and by the other carry of the multiplication table matrix.

According to another characteristic of the invention, the multiplication table matrix and the first addition table matrix exploit the digits A, B, C and R in their ordinal form, i.e. the binary part of each digit supplies two inputs according to whether the binary digit is 0 or 1, whereas the quinary part of each digit supplies five inputs.

According to another characteristic of the invention, the second addition table matrix gives the result of the operation $(A\times B)+C+R$ in code.

According to another characteristic of the invention, the first and the second carry table matrices supply the carry digit of the operation $(A\times B)+C+R$ in code.

The above mentioned and other objects and features of the invention will become more apparent and the invention itself will be best understood by referring to the following description of embodiments taken in conjunction with the accompanying drawings which represent:

FIG. 1, a diagram representing the complete calculating table matrix,

FIG. 2, a diagram representing in a more detailed way the multiplication table matrix TM represented symbolically in FIG. 1, FIG. 3, a diagram representing the partial multiplication table matrix TM1 shown at FIG. 2 and being part of the multiplication table matrix TM.

FIG. 4, a diagram representing another part of the partial multiplication table matrix TM1 and which has not been shown at FIG. 3 in order not to load the drawing uselessly.

FIG. 5, a diagram of the partial multiplication table matrix TM2 shown at FIG. 2 and being part of the multiplication table matrix TM.

FIG. 6, a diagram of the partial multiplication table matrix TM3 being part of the multiplication table matrix TM represented at FIG. 2.

FIG. 7, a diagram of the first addition table matrix TA1 represented schematically at FIG. 1.

FIG. 8, a diagram of the second addition table matrix TA2 represented schematically at FIG. 1.

FIG. 9, a diagram of the translator TR represented at FIG. 1 as being part of the arrangement A1 and which is used to translate five 3-digit binary codes in an ordinal form i.e. the translator presents six input terminals, two for each binary digit and five output terminals.

FIG. 10, a representation of the complement taking circuit which permits obtaining the complement to 9 of a decimal digit, the decimal digit presenting itself at the input of a complement taking circuit in the form of a 4-digit binary code and appearing also at the output of the complement taking circuit in the form of a 4-digit binary code.

FIG. 11, a multiplication table of the quinary parts of two decimal digits.

FIG. 12, a multiplication table of the quinary parts of two decimal digits, but this product being expressed in modulus 5.

FIG. 13, a multiplication table giving the binary part of the units' digit characterising the product of two decimal digits.

FIG. 14, a multiplication table giving the tens' digit of the product characterising the multiplication of two decimal digits.

FIG. 15, an addition table of the binary parts of two decimal digits.

FIG. 16, an addition table of quinary parts of two decimal digits.

FIG. 17, an addition table of quinary parts of two decimal digits but giving the first binary digit of the result when the latter is expressed in the form of a 3-digit binary code.

FIG. 18, an addition table of the quinary parts of two decimal digits but giving the second binary digit of the result when the latter is expressed in the form of a 3-digit binary code.

FIG. 19, an addition table of the quinary parts of two decimal digits but giving the third binary digit of the result when the latter is expressed in the form of a 3-digit binary code.

FIG. 20, a diagram representing a way to choose a 3-digit binary code permitting the representation of the quinary part of a decimal digit and in such a way that a minimum number of elements is necessary for the recognition of a particular code.

FIG. 21, a diagram representing another way to choose a 3-digit binary code permitting the representation of the quinary part of a decimal digit and in such a way that a mimimum number of elements is necessary for the recognition of a particular code.

FIG. 1 represents a diagram showing the complete calculating table matrix by means of which the operation $(A \times B)+C+R$ may be effected. This operation is necessitated by multiplication. A represents a digit of the multiplicand, B a digit of the multiplier, C the digit of the corresponding partial product and R the carry digit of the preceding operation. With this system, the partial product digits of same rank are successively added up to define the final product digits. The lowest digit of the first partial product will of course be the lowest digit of the final product. The second digit starting from the bottom of the first partial product will intervene at the determination of the lowest digit of the second partial product and their adding up will thus give the second digit starting from the bottom of the definitive product. These operations will be repeated until all digits of the multiplicand have been multiplied by all the digits of the multiplier.

The use of such a basic formula is particularly advantageous because it permits the saving of time and equipment. Indeed, the arithmetical part of a universal machine could comprise an arrangement effecting only a product of decimal digits as well as another arrangement by means of which the additions may be effected, these being necessary for the carries as well as for the adding up of the partial products in case of a multiplication. However in this case it would be necessary to provide a considerable equipment permitting switching either towards the multiplication arrangement or towards the addition arrangement, which results in an increase of the necessary equipment as well as in an increase of the time necessary for the operations.

In the way that the formula $(A \times B)+C+R$ occurs, one could in principle constitute a series arrangement comprising a multiplication table matrix to effect $(A \times B)$ and this multiplication table matrix would be followed by an addition table matrix.

However, this arrangement would necessitate at least three carry table matrices and moreover, as each table matrix has a certain time constant, if one considers table matrices of the electronic type using selenium rectifiers, the resulting time constant would be composed of the sum of all the time constants.

According to FIG. 1 at the input of the calculating table matrix a multiplication table matrix TM is found by means of which the product of the two decimal digits A and B is effected and an addition table matrix TA1 by means of which the sum of the two decimal digits C and R is effected. These two operations are effected in parallel which leads to a decrease of the resulting time constant because the first two operation table matrices can be balanced (dying out of transients due to capacitances) at the same time. Moreover, there are only two carry table matrices: TR1 and TR2, and the carry memory is unique because the tens' digit of the operation result $$(A \times B)+C+R$$

is always smaller than or equal to 9. The disposition of the calculating table matrix which also comprises the second addition table matrix TA2 will permit an economy of time and of material.

Coming back to the fact that the carry memory of the operation $(A \times B)+C+R$ is unique, this can be proved in the following manner and in fact for any radix.

If the radix is called $r$, i.e. $r=10$ in case of a decimal numbering, at the start of a series of operations, the carry digit R will be equal to 0. Consequently, the result of a first operation will give at the most:

$$(A \times B)+C+R=(r-1)(r-1)+(r-1)=r(r-1)$$

The carry report of this operation will thus at the most be equal to $(r-1)$. Consequently, a second operation will give at the most:

$$(A \times B)+C+R=(r-1)(r-1)+(r-1)+(r-1)=r^2-1$$

For decimal numbering, the result of the basic operation given by the calculating table matrix represented at FIG. 1, will thus always be inferior to 100 and consequently, the tens' digit of the result which will form the carry of the next operation cannot exceed 9.

FIG. 1 represents four assemblies A1, B1, R1 and C1 in which the four digits on which the calculating table matrix has to operate will be registered. These digits will also be registered, but partially, on the flip-flop devices BSA, BSB, BSR and BSC which correspond respectively to the above mentioned assemblies. Each of these assemblies comprises three flip-flop devices such as BSA1, BSA2, and BSA3 for the assembly AI as well as a translator TR. Each decimal digit will be registered on the four corresponding flip-flop devices i.e. BSA, BSA1, BSA2 and BSA3 for the digit A. A decimal system with binary coding will thus be used. In this system which is well known, the decimal numbering is essentially kept, but a 4-digit binary code is adopted for the registering of a decimal digit in order to save equipment. This system where the decimal numbering is maintained, is especially justified for commercial machines, i.e. machines where the calculating time is relatively small with respect to the quantity of information which is supplied to the machine and the quantity of results which this machine has to produce. Indeed, in keeping this system essentially decimal, translations into binary numbering are avoided which, in view of the large number of informations at the input and at the output would be expensive and would take much time. In the case of a universal computer, it is generally preferred to use binary numbering. Indeed, such machines have to perform a much larger number of operations on less data. Consequently, translations from decimal radix into the binary radix and vice-versa are allowed because the translator devices which are more complicated to pass completely from the decimal radix to the binary radix and vice versa are compensated by an economy of time and equipment, in view of the fact that the machine performs all its calculations according to the binary radix.

In some cases however, even for a universal computer, an essentially decimal radix might be preferred. For instance, in a machine comprising a magnetic drum memory, as well as a magnetic tape memory, it is necessary in order to transfer the information from one of these memories to the other, to use a third memory serving as connection between the first two. Indeed, the first two memories operate at substantially different speeds and cannot be easily synchronized one with the other for the transfer of information. The transfer memory can be constituted by an assembly of binary elements, such as cold cathode tubes, which are connected in series and can register a certain information, and which can have this information advanced step-by-step without altering it. Such a type of memory line has been described in U.S. Patent No. 2,649,502. The memory line comprising the cold cathode tubes described in this patent (No. 2,649,502) can receive the information coming from the tape memory being advanced in synchronism with the speed of the tape. After this first operation, the information which is now found in the memory lines can be transferred to the drum memory, the latter transfer being effected this time in synchronism with the rotating speed of the drum. The reverse operations, from the transfer of the drum memory to the ribbon memory are of course made in a similar manner. However, memory lines using cold cathode tubes have a limited operating speed and it is difficult for instance to operate them at more than 50 kc./s. while keeping a sufficiently high security factor. But, frequencies of the order of 100 kc./s. are permitted by the drum memory. In that case, the adoption of a 4-digit binary code for each decimal digit will permit the use of four parallel memory lines for the registration of a series of decimal digits. Each of the four memory lines will be affected for the registration of a particular binary digit between the four binary digits used to characterize the decimal digits. In that way, one could, for instance, have each of the memory lines operated at 25 kc./s. and by means of appropriate phase shifting (by quarters of period), the arrangement could be adapted to the feeding of a drum memory functioning at 100 kc./s.

Referring to FIG. 1, it can be supposed that the flip-flop devices such as BSA, BSA1, BSA2 and BSA3 are each fed by a memory line (not shown) of the type defined. There will thus be four memory lines corresponding to digit A, four memory lines corresponding to digit B and four memory lines for C, R being treated in another way as well be seen later.

Supposing that each of the four series of four flip-flop devices has received the digits A, B, R and C respectively, the calculating table matrix is ready to function. The multiplication and addition operations are however not effected in code because this solution has been found more expensive. On the contrary, the digits are exploited in their ordinal form. However, if the purely decimal numbering is used, a multiplication or an addition table matrix would comprise 20 inputs, 10 inputs for each digit. This would cause a large operating time constant which would result in the accumulation of the capacities on the inputs. On the other hand, 12 outputs would be necessary for an addition table matrix (the sum of two decimal digits being limited to 18) and 19 outputs would be necessary for the multiplication table matrix (the product of two decimal digits being limited to 81). Consequently, there would also be accumulation of the capacities on the outputs which would also cause an increase of the time constant.

In order to avoid this disadvantage, each decimal digit will be divided into a binary part and into a quinary part. These two parts will be exploited in their ordinal form. It is thus seen that for the inputs it is only necessary to have two sets of seven terminals.

For the multiplication table matrix TM, represented at FIG. 1 the 14 input terminals are A0/1, A'0/4, B0/1 and B'0/4. For the first addition table matrix TA1, also shown at FIG. 1, the 14 input terminals are R0/1, R'0/4, C0/1 and C'0/4. The terminals, such as A0 and A1, can be used for the ordinal exploitation of the binary part of the decimal digit by connecting them directly to the two outputs of the flip-flop device, such as BSA. For the terminals A'0/4 which are used for the ordinal exploitation of the quinary part of the decimal digit, a translator device TR has to be interposed between these terminals and the three pairs of terminals, such as AB0 and AB1, respectively connected to the two outputs of the flip-flop device BSA1.

The translator device TR is represented in detail in FIG. 9.

Before examining the translator circuit, shown at FIG. 9, the 4-digit binary codes used to represent the ten decimal digits will first of all be defined. The system is defined as follows:

| | |
|---|---|
| 0=0000 | 5=1000 |
| 1=0001 | 6=1001 |
| 2=0010 | 7=1010 |
| 3=0101 | 8=1101 |
| 4=0100 | 9=1100 |

One knows that the number of 4-digit binary coding systems for representing the 10 decimal digits is equal to $$\frac{16!}{6!}$$

i.e. a considerable number of possible combinations. A study has already appeared on this subject in P.I.R.E. October 1953, this study being entitled "Coded Decimal Number Systems for Digital Computers."

The particular system shown here above has the following advantages:

It is divided into a binary part formed by the first out of four digits and a quinary part formed by the last three digits. Thus, the first symbol will give the binary part (see the direct connections between BSA and A0/1, FIG. 1). With regard to the quinary part (the last three digits), it will be recognized by means of a limited number of elements. Indeed, the digit 2 is immediately recognized by the third symbol which is 1 in this case only. As the quinary part of the digit 7 is the same as that of the digit 2 (and the same for 5 and 0, 6 and 1, 8 and 3, 9 and 4), the quinary part of the digit 7 will be recognized in the same manner, the distinction between 2 and 7 being made by their binary part, i.e. the first symbol is 0 for 2 and 1 for 7. The 1, the 3 and the 4 will be recognized according to the second and the fourth symbol. Finally the 0 will be recognized by the examination of the second, the third and the fourth symbol.

Moreover, the coding system has the advantage that the complement to 9 of a decimal digit is obtained by reversing the first and the second symbol. There is an apparent exception with respect to 2 and 7, because these two decimal digits are complementary with respect to 9 but also have a same quinary part because their difference is equal to 5. Indeed, by reversing the first two symbols of 2, one obtains 1110 which does not correspond to 7. However, the "error" is but apparent, because only the second reverse symbol does not correspond to the second symbol of 7. But the binary part of 7 is recognized by the first symbol whereas its quinary part is recognized by the third symbol. Consequently, the second symbol does not come into account in this case. The same reasoning is applicable when the complement to 9 of 7 is taken.

Finally, the ten combinations chosen out of the sixteen possible ones do not comprise the combination 1111. In a memory line, this combination could correspond to four ionized cold cathode tubes in corresponding stages of four memory lines exploited in parallel as previously described. For memory lines of 10 stages, an arrangement of four parallel lines could also give at a certain moment 40 ionized cold cathode tubes. But, as it can be seen in Patent 2,649,502, referred to above, forward movement impulses are used to have the information moved forward step-by-step and a first effect of each impulse is to deionize all the cold cathode tubes which are conductive. Consequently, by avoiding the combination 1111, 30 out of the 40 tubes at the most will be ionized, which means that the necesary power for the device producing forward movement impulses can be reduced by 25%. Also, on the whole the dissipated energy will be less.

Finally the 10 combinations shown above have been chosen according to the method suggested in the application of W. Pouliart, Serial No. 411,523, filed February 19, 1954, in order to avoid a series of 1's exceeding three when a plurality of these combinations are put in series one next to the other.

The explanations which precede will permit easy understanding of the functioning of the translator shown at FIG. 9. Four electrical gates of the coincidence type, also called "AND" type, are necessary. For instance, the gate marked with digit 3 and which has its inputs (white arrow) connected to the terminals AB0, AC0, AD0 has its output connected to terminal A'0. Consequently, when the flip-flop devices BSA1, BSA2, BSA3 (FIG. 1) are all three in their position 0, it is arranged that the gate gives a signal on terminal A'0 and only in case the three flip-flop devices are in the position 0. The three other gates function in the same way, the digit designating the inside of the circle, in this case equal to 2, indicating that signals have to appear on all input terminals in order to cause an output signal. As the quinary part of digit 2 and of digit 7 is only recognized by the third symbol, it is sufficient to connect terminal AC1 to terminal A'2.

FIG. 21 represents graphically how the combinations of three binary digits can be chosen in order to limit the gate to what is shown in FIG. 9 to recognize the five combinations used. According to a method already used to determine graphically the codes permitting the detection of and/or the correction of mistakes, which is however not the case here, a cube is shown the eight apices of which represent eight possible combinations according to a three coordinate system. In order to choose five combinations leading to an arrangement of the type shown at FIG. 9, it will be sufficient that four out of five combinations occupy the same plane perpendicular to one of the three axes of the rectangular coordinates.

It is to be remarked that one could also choose five combinations which could each be recognized by two symbols only. Indeed, this more uniform arrangement will permit six combinations out of eight to be recognized by this means. By using again a cube the apices of which define the eight possible combinations, one could determine the way to choose the six combinations.

As shown in FIG. 20, it will be sufficient by starting from an apex of the cube to return thereat by passing successively along six edges and in such a way that the changes in direction at each top are effected in a cyclic manner. This amounts to saying that in the succession of six codes thus obtained, a code differs from the preceding one by one symbol only, and the differences pass from one symbol to the other in a cyclic manner.

From what precedes it can be seen that the digits A and B occur at the multiplication table matrix TM in their ordinal form but by using a binary part and a quinary part, which leads to two series of 7(5+2) input terminals.

FIG. 2 shows the subdivision of the multiplication table matrix TM into three table matrices TM1, TM2 and TM3. Table matrix TM1 is fed by the arrangement of 14 input terminals. Table matrix TM2 is only fed by 10 input terminals representing the quinary terminals of A and of B. The multiplication table matrix TM3 is an auxiliary table matrix which cooperates with the partial table matrices TM1 and TM2.

First of all the functioning of the table matrix TM2, which is represented in detail at FIG. 5 will be explained. The operation $A \times B$ can be written $$(5A+A') \times (5B+B') = 10(5D+D') + (5U+U')$$

where A and B this time represent only the respective binary parts, whereas A' and B' represent respectively the quinary parts. The result is expressed by a unit digit accompanied by a tens digit which will be used to form the carry in conjunction with the carry obtained at the addition table matrices which will be described later. The binary part of the tens digit is represented by D whereas the quinary part is represented by D'. The binary part of the units digit is represented by U whereas the quinary part is represented by U'. One has four terms at each side of the equality, and as all these terms are multiples of five with the exception of A',B' and of U',U' is only a function A' and of B' i.e. of the quinary parts of the two decimal digits which have to be multiplied.

This justifies a special partial multiplication table matrix, i.e. TM2. The different products are represented at FIG. 11. The squares are but partially filled out because there is of course symmetry with respect to the diagonal 0, 1, 4, 9, 16.

FIG. 12 represents the different values of U' i.e. of A' B' mod. 5. The same symmetry occurs.

FIG. 14 represents a table, of 100 points this time, and giving the tens digit of the product, i.e. $5D+D'$. This time the result is a function not only of A' and of B', but also of A and B i.e. the binary parts of the two digits having to be multiplied which leads to an arrangement of four groups of 25 points.

Figure 1:
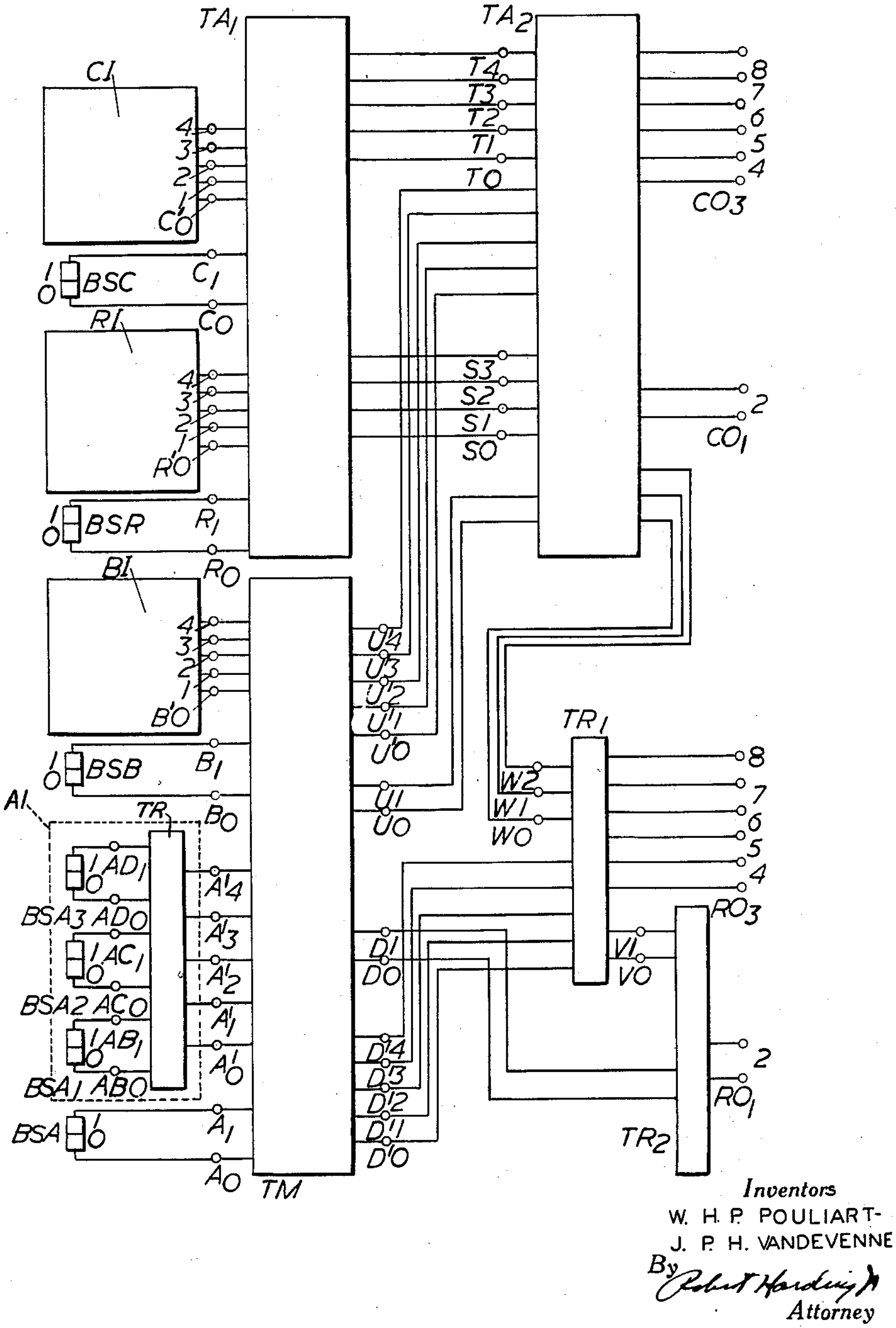

By examining the first quadrant, i.e. the one for which A and B are both equal to 0, it is remarked that the tens digit is nearly always equal to 0. There are but two exceptions: in case that the two quinary parts are respectively equal to 3 and 4 or in case that the two quinary parts are both equal to 4. Just as for the tables shown at FIGS. 11 and 12, it will be seen that the first quadrant is but partially filled in because there is symmetry with respect to the diagonal 0,0,0,0,1.

If the second quadrant is considered i.e. the one for which $A=1$ and $B=0$, more diversity is remarked in the tens digit of the product, but some rules can nevertheless be deduced. When the quinary part B' is equal to 0, the tens digit is also equal to 0. This is also true when the quinary part B' is equal to 1. When the quinary part B' is equal to 2, the tens digit is equal to 1. When the quinary part B' is equal to 3 or 4, the tens digit is equal to 2 but this time exceptions occur. When B'1 is equal to 3 but the product of the quinary parts B'A' is either $3 \times 1$, or $3 \times 0$, the tens digit is equal to 1. Moreover, when B' is equal to 4 and A' is equal to 3 or 4, the tens digit becomes equal to 3.

The third quadrant, the one for which $A=0$ and $B=1$ has not been filled in because it corresponds to the second quadrant which has just been described, each row of the latter corresponds to a column of the third quadrant and this in the order of the quinary parts of the input digit the binary part of which is equal to 0. The rules for obtaining the tens digit in case that A is equal to 0 and B is equal to 1 will thus be identical to those described for thie case that A is equal to 1 and B is equal 0, because it is sufficient to permute A and B as well as A' and B'.

For the fourth quadrant i.e. when A and B are both equal to 1, it is not possible to establish rules subject to exceptions, as in the case of the three other quadrants. A special table matrix will thus be necessary but for this quadrant only.

On the whole, it is seen that the number of exceptions is very limited and there are only two groups of exceptions. The former occurs when the product of the quinary parts is equal to 12 and to 16, and this is true for the three quadrants. The second exception occurs solely for the second and the third quadrant and in case that the quinary part corresponding to the binary part equal to 0 is 3 and that simultaneously the other quinary part is 0 or 1.

A third multiplication table, shown at FIG. 13, will now be examined and which gives the binary part of the units digit of the product. In this case there are but two possibilities with respect to the result which is either 0 or 1. This table is also a table of 100 points divided into four quadrants according to the value of the binary parts of the two decimal digits having to be multiplied. By examining the first quadrant i.e. when A and B are both equal to 0, it is remarked that the binary part of the units of the product is equal to 0 with the exception of the products of the quinary parts giving either 6, or 8, or 9, or 16. In case of the second quadrant when A is equal to 1 and B is equal to 0, the binary part of the units digits is equal to 1 when B′ is equal to 1. For the next three rows, exceptions are noted. When B′ is equal to 2, U is equal to 0, except for the products of the quinary parts which are equal to 6 or 8. When B′ is equal to 3, U is equal to 1 with the exception of the products of the quinary parts which are equal to 6 or 9. Finally for $B'=4$, U is equal to 0 with the exception of the products of the quinary parts giving 8 or 16.

For the third quadrant, i.e. when A is equal to 0 and B is equal to 1, the rules are identical to those described for the second quadrant, as well as for their exceptions. It is sufficient to permute A and B as well as A′ B′.

For the fourth quadrant, rules with exceptions cannot be deduced and a special table matrix is to be provided in case that A and B are both equal to 1.

Apart from the question of the fourth quadrant which is treated in a separate table matrix, it is remarked that there are only four exceptions, those where the products of the quinary parts are equal to 6, 8, 9 and 16. These exceptions can be considered as a whole. By considering FIGS. 13 and 14 with the exception of their fourth quadrant, it is thus remarked that there are only three exception groups which are a function of the product of the quinary parts of the two decimal digits which have to be multiplied. The first will be denoted by *c*0 and covers the products of the quinary parts equal to 12 or 16. The second will be denoted by *c*1 and covers the products of the quinary parts equal to 6, 8, 9 or 16. The third, which will be denoted by *c*2, covers the cases in which the quinary part, corresponding to the binary part which is equal to 0, is equal to 3, whereas the quinary part, corresponding to the binary part equal to 1, is equal either to 0 or to 1.

The explanations which precede will permit the examination of the different partial multiplication table matrices TM1, TM2 and TM 3 which are derived from the preceding considerations.

Table matrix TM2 is solely a function of the quinary parts and it will thus give the quinary part of the units digits of the product. This is effected by means of a first stage of AND type circuits followed by a second stage of OR type circuits. The arrangement of AND circuits has been represented by GA1. This AND circuit consists of gates (for instance electronic gates using selenium rectifiers) and which have two inputs which must both be activated in order to produce an output signal, according to well known techniques. As there are two series of five input terminals A′0/4 and B′0/4, there will thus be 25 coincidence gates, one of which branched on A′2 and B′4 has been represented by way of example. Its output is connected to the terminal U′24, the digits 2 and 4 in this order permitting the identification of the two inputs of the gate. The second part of the partial multiplication table matrix TM2 simply consists of different groups of OR circuits which are used in order to group the various outputs of GA1 which correspond to a same digit U′. For instance, the digit U′ representing the quinary part of the product will only be equal to 4 when a signal will appear either on terminal U′22, or on terminal U′33, or on terminal U′14 or on terminal U′41. Consequently, these four terminals will form the inputs of an OR circuit GO1 which in response to a signal on either of its inputs delivers an output signal i.e. on terminal U′4 corresponding to digit 4 for the quinary part of the units digit of the product. These OR circuits are thus buffer circuits which permit the decoupling of the various inputs in order to avoid undesirable couplings.

It will be remarked that the three exception arrangements previously mentioned are all functions of the value of the product of the quinary parts of the two digits which have to be multiplied. Consequently, the partial multiplication table matrix TM2 which gives the quinary part of the units digit of the product will also be able to give the exception criteria which will be used as will be seen later in order to give the binary part U of the units digit of the product as well as the quinary part of the tens digit of the product.

The signals announcing exceptions will appear on terminals *c*0, *c*1 and *c*2. These terminals constitute the output of OR circuits the inputs of which are connected in an appropriate way to the output terminals of GA1. For instance, terminal *c*0, which corresponds to the exception arrangement where the products of the quinary parts of the two decimal digits to be multiplied are equal to 12 or 16, forms the output of the buffer circuit GO2, the three inputs of which are respectively connected to terminals U′44, U′34 and U′43.

Figure 2:
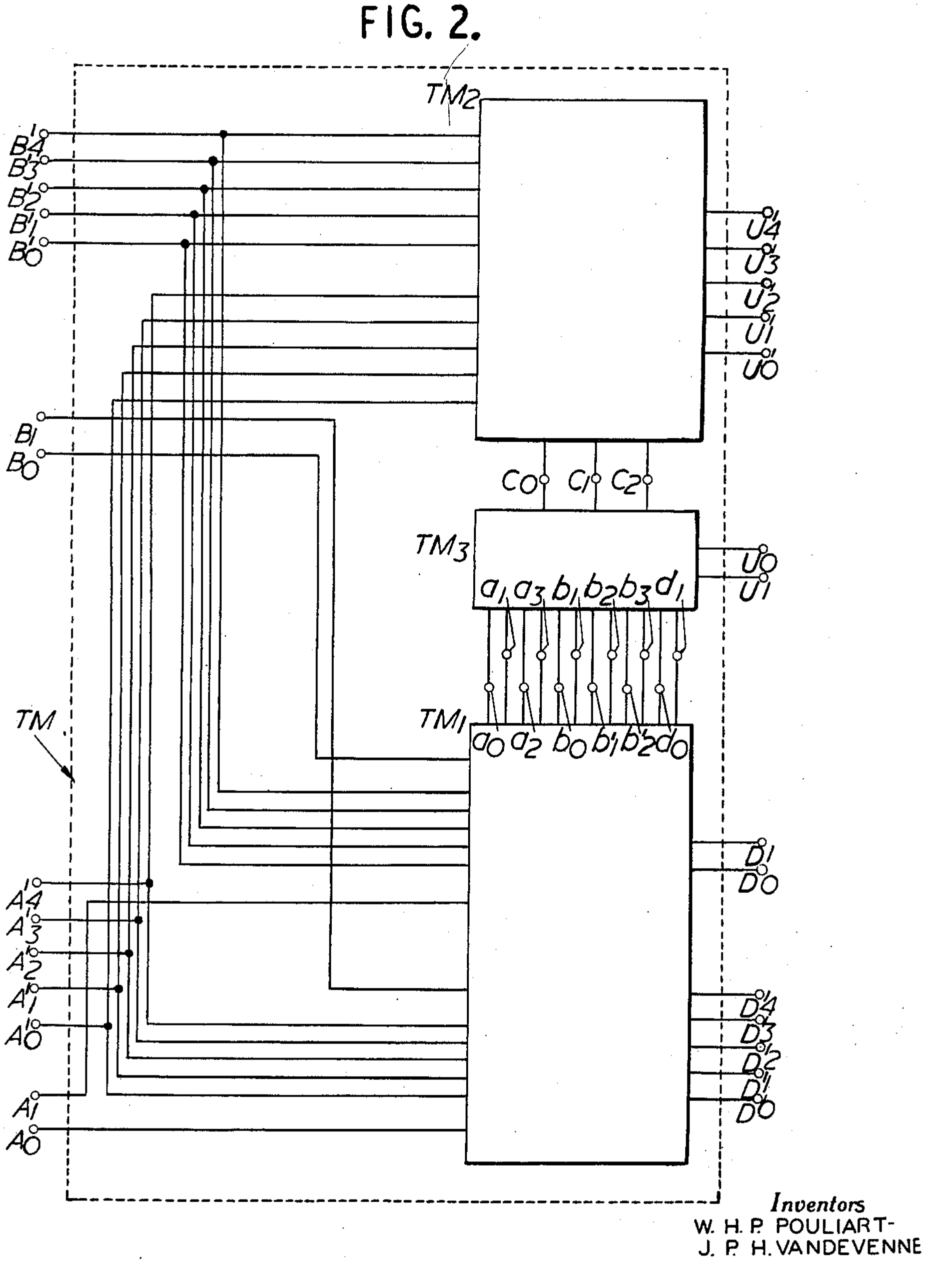

As is shown in FIG. 2, the three terminals *c*0, *c*1 and *c*2 of TM2 are also connected to TM3 which constitutes the third partial multiplication table matrix. This table matrix is an auxiliary table matrix of which four terminals, *a*0, *a*1, *a*2 and *a*3 are connected to the first partial multiplication table matrix TM1, and receive from it the indications which will be compared with the exception indications appearing on terminals *c*0, *c*1 and *c*2, in order to determine the digits of the result which depend on the exception criteria. These results depending on these exception criteria will be set back to the table matrix TM1 by means of the terminals *b*0, *b*1 and *b*′1, *b*2, *b*′2 and *b*3. Two other terminals will still be used to interconnect the tables matrices TM1 and TM3: *d*0 and *d*1. The latter two terminals will conduct from TM1 to TM3 the information characterizing the binary part of the units digit of the product, because the terminals characterizing this digit are connected to TM3, U1 and U0. The interconnections between TM1 and TM3, with the exception of terminals *a*0, *a*1, *a*2 and *a*3 are of course, arbitrary and depend only on the arrangement of the drawings.

The structure of the partial multiplication table matrix TM1 will now be examined. By virtue of the previously given explanations in relation to the tables of FIGS. 13 and 14, it has been been found possible to limit the number of coincidence gates which will have to be connected to the various inputs of TM1. The number of these coincidence gates has been limited to 36. As the number of coincidence gates of GA1 for TM2 is limited to 25, it is thus seen that the total number of coincidence gates is reduced to 61, if the few coincidence gates which will be necessary to form the auxiliary table matrix TM3 are excepted.

Figure 3:
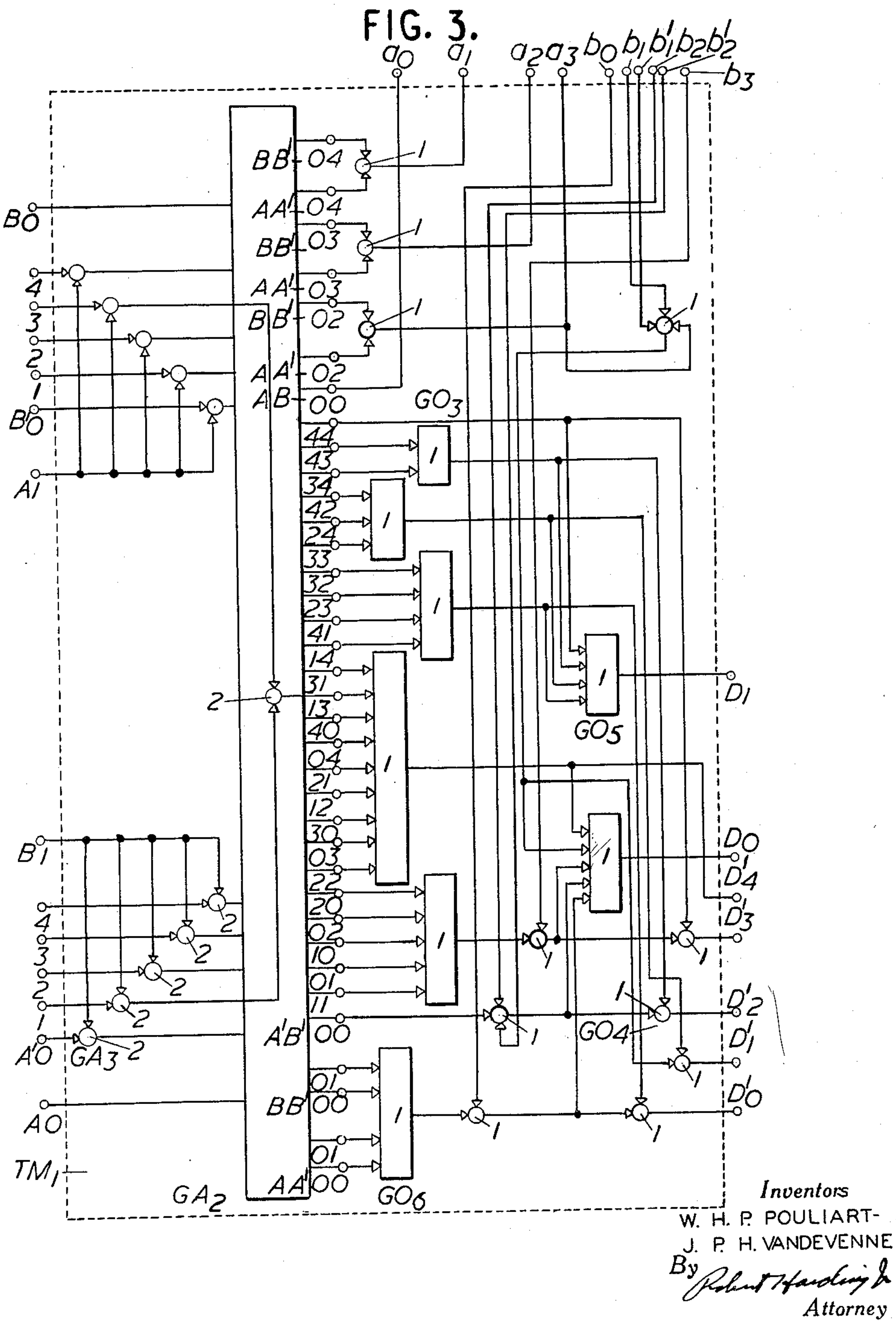

In examining FIG. 3, which represents the major part of TM1, it is seen that terminal B1 on which a signal appears when the binary part of B is equal to 1, i.e. when the decimal digit is at least equal to 5, is used to permit the access of the signals appearing on the five terminals A′0/4 to the arrangement of AND circuits called GA2. The terminals, such as A′0, are thus connected to coincidence gates such as GA3, the second input of which is always connected to terminal B1, so that the signals coming into gating GA2 from gates GA3 may be referred to as B1—A'0 to B1—A'4 signals. Terminal A1 exercises at terminals B'0/4 the same function as terminal B1 exercises with respect to terminals A'0/4 and the signals entering GA2 as a result of combinations of a signal on A1 with signals on terminals B'0 to B'4 may be considered as signals A1—B'0 to A1—B'4. Finally terminals A0 and B0 connect directly to the arrangement GA2 which comprises, as already mentioned, 36 coincidence gates such as the one shown. The latter will react when it will simultaneously receive signals coming from terminals A'1 and B'3, but only in case B1 and A1 both receive signals. The output of this coincidence gate, shown by way of example, is connected to terminal A'B'13. This terminal A'B'13 is part of an arrangement of 25 terminals corresponding to two groups of five terminals A'0/4 and B'0/4. The eleven remaining output terminals of GA2 are respectively connected to the outputs of the eleven coincidence gates of which one has its inputs connected to the terminals A0 and B0, and of which the output thus goes towards terminal AB00. Five other output terminals connect to the outputs of gates respectively combining a signal from A0 with signals B1—A'0 to B1—A'4 and these five terminals are designated AA'0 to AA'4. The remaining five terminals BB'0 to BB'4 are in the outputs of gates respectively combining signal B0 with signals A1—B'0 to A1—B'4.

The various outputs A'B'00/44 (25 outputs in total) are combined by means of OR circuits in order to give a tens digit i.e. the quinary part of the tens digit as well as its binary part. This can be done without ambiguity because the terminals A'B'00/44 correspond to signals appearing on the terminals A1 and B1, i.e. the case corresponding to the fourth quadrant of FIG. 14 where the binary parts of the two digits to be multiplied are both equal to 1. It is to be noted that at FIG. 14 the tens digit is given in its decimal form. Consequently, for digits exceeding 4, 5 has to be substracted to obtain the quinary part and in that case the binary part of the tens digit of the product will be equal to 1. If, for instance the output terminals A'B'34 and A'B'43, are taken, the latter will be connected to the input of a buffer circuit GO3 the output of which is connected to the terminal D'2 by means of a second buffer GO4. This indicates that the quinary part of the tens digits of the products is equal to 2. Indeed terminals A'B'34 and A'B'43 correspond to the quinary parts of the digits to be multiplied which are respectively equal to 3 and 4 and this for corresponding binary parts which are equal to 1. The table at FIG. 14 gives 7 which corresponds to a quinary part equal to 2. The binary part is equal to 1 and is obtained by connecting the output of GO3 to another buffer circuit GO5 the output of which is connected to terminal D1.

In relation to the four terminals AA'00, AA'01, BB'00 and BB'01 these are all connected to the input of a buffer circuit GO6 the output of which is connected to terminal B'0 and D0 by means of other buffer circuits. Indeed, the four output terminals of GA2 which have just been mentioned correspond to the first two rows of the second quadrant of FIG. 14, as well as to the first two columns of the third quadrant for which the tens digit of the product is always equal to 0 without exception.

Figure 4:
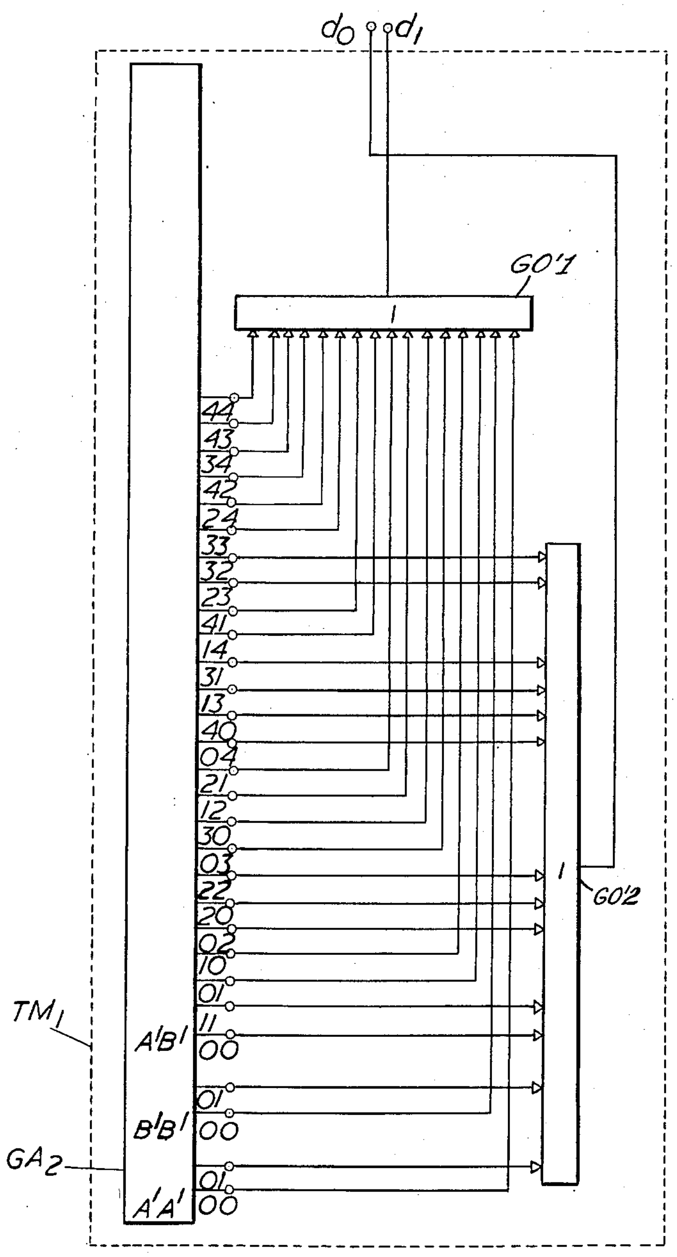
Figure 5:
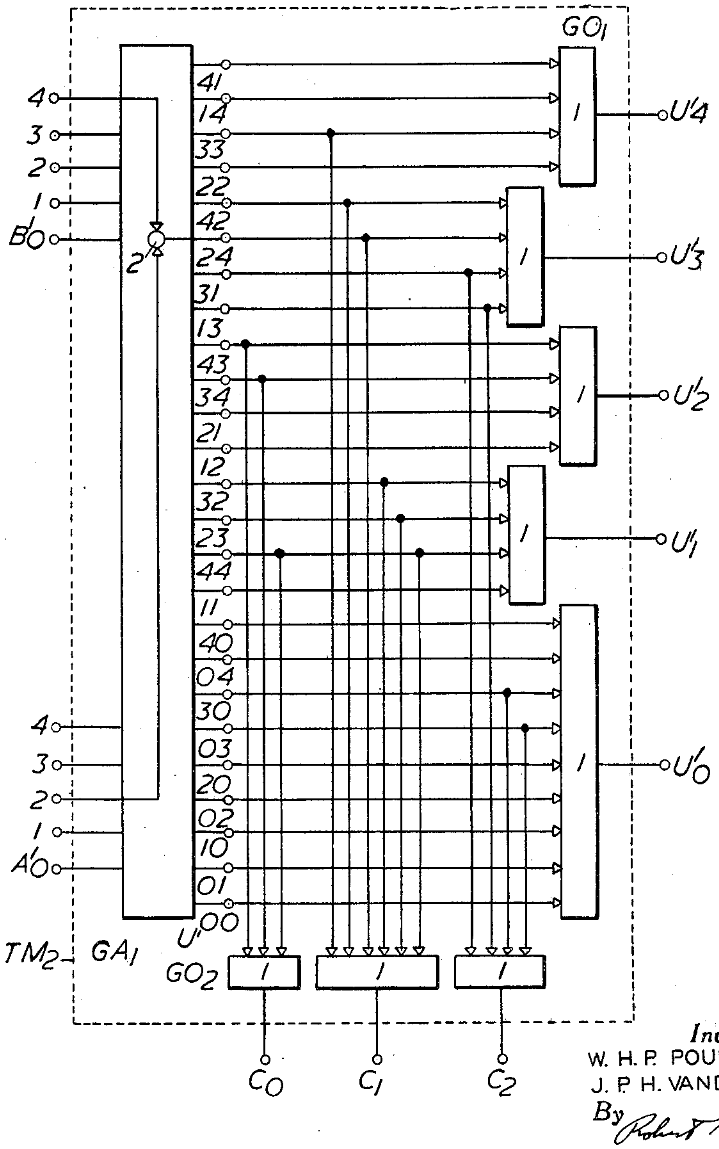
Figure 6:
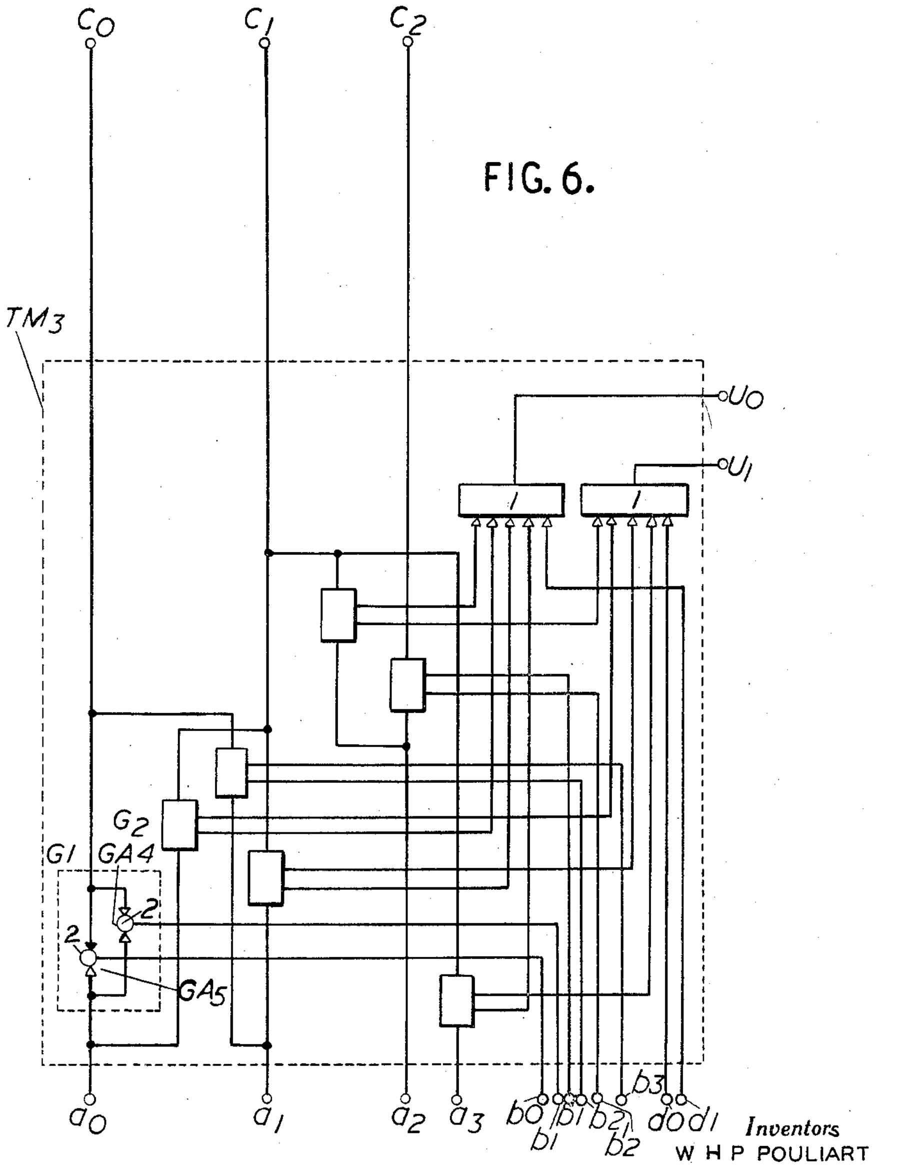

Before starting the examination of the last seven terminals of GA2 (terminals at the extreme right), the connections for obtaining the binary part of the units digit of the product will be considered. These connections also start from the output terminals of GA2, but in order not to complicate FIG. 3, the remaining part of TM1 has been shown at FIG. 4 where GA2 is again represented, but partially. There are but two buffer circuits GO'1 and GO'2 according to whether the binary part of the units digit is 1 or 0. The output of the former is connected to terminal $d1$ whereas the output of the latter is connected to terminal $d0$ which connect respectively to the buffer circuits which have been shown at the partial multiplication table matrix TM3 of FIG. 6. The outputs of these latter buffers go directly to terminals U0 and U1. It will be seen without difficulty that the connections shown at FIG. 4 and at FIG. 6 permit obtaining the binary part of the units digits in all cases which are not ambiguous. For instance in the case of the fourth quadrant of FIG. 13, in the case of the first two rows of the second quadrant of this figure and also for the first two columns of the third quadrant of this figure. Of course, the qualificative "ambiguous" is solely derived from the fact that for the first, second and third quadrants certain rules have been established and that only the first two rows of the second quadrant and the first two columns of the third quadrant do not provide exceptions to these rules. In other words, for the fourth quadrant there is no ambiguity because there are no rules permitting a simplification of the connections due to the groupings.

Finally the case of the last seven terminals connected to GA2 will be examined. The first, AB00 is connected to the terminal $a0$, the next two, AA'02 and BB'02 are connected to terminal $a3$ by means of a two-input buffer circuit. The terminals AA'03 and BB'03 are connected in the same way to terminal $a2$. Also, terminals AA'04 and BB'04 are connected to terminal $a1$. As it is seen on FIG. 6 which shows the auxiliary multiplication table matrix TM3, these terminals are connected to the two gate arrangements, such as G1, which comprises gates GA5 and GA4. The latter gates are of the coincidence type, but whereas GA4 requires the simultaneous presence of two signals at its input terminals to produce an output signal, gate GA5 will only produce an output signal when the signal will appear at $a0$ when at the same moment there is no signal at $c0$. As seen previously, a signal will appear at terminal $c0$ when the product of the quinary parts of the two digits to be multiplied is either equal to 12, or equal to 16. If this is the case, a signal at terminal $a0$ will not produce a signal at the output of GA5, but a signal will be produced at the output of GA4. As this latter output is connected to terminal $b1$ which goes towards the circuit TM1 at FIG. 3 and more particularly by means of buffer circuits towards terminals D0 and D'1, it is seen that a tens digit of the product is obtained the quinary part of which is equal to 1 and the binary part of which is equal to 0, i.e. the decimal digit 1. This is indeed correct because terminal AB00 corresponds to the first quadrant of FIG. 14 i.e. in case the binary parts of the two digits to be multiplied are both equal to 0. As on the other hand, a signal appears at terminal $c0$ when the product of the quinary parts is equal to 12 or 16, the tens digit of the product is indeed 1, as FIG. 14 indicates.

In view of what precedes, it is not necessary to explain all the other cases in which signals appear at the last seven output terminals of GA2 which will be treated in a manner analogous to the particular case which has just been described. In considering FIG. 6, it will also be remarked that some of the outputs of the two gate arrangements of the same type as G1 are also connected to terminal U1 or U0 by means of a corresponding buffer circuit. This will give the binary part of the units digit according to the particular rules and their exceptions. For the example wihch has just been treated above, i.e. in case of a signal appearing on terminal AB00 (FIG. 3) and in case the product of the binary parts of the two digits to be multiplied is equal to 16, a signal will appear on terminal $c1$. Consequently the gate arrangement G2 will deliver a signal on the upper output wire and no signal on the lower output wire, which leads to the appearance of a signal at terminal U1. This is indeed correct, as the first quadrant of FIG. 13 indicates that the binary part of the units digit is equal to 1 when the product of the quinary parts of the two digits to be multiplied is equal to 16.

Referring to FIG. 1, the addition table matrices will now be considered. Two main addition table matrices are provided: TA1 and TA2. The first addition table matrix TA1 operates on the decimal digits C and R and more precisely on the quinary and binary parts of these two digits. The binary parts are directly given by the state of the flip-flop devices BSR and BSC the outputs of which are connected to terminals R0, R1 and C0, C1. The quinary parts are obtained at terminals R'0/4 and C'0/4 which are connected respectively to the arrangements RI and CI. These two arrangements are identical to the arrangements AI and BI the first of which has been described in detail.

Figure 7:
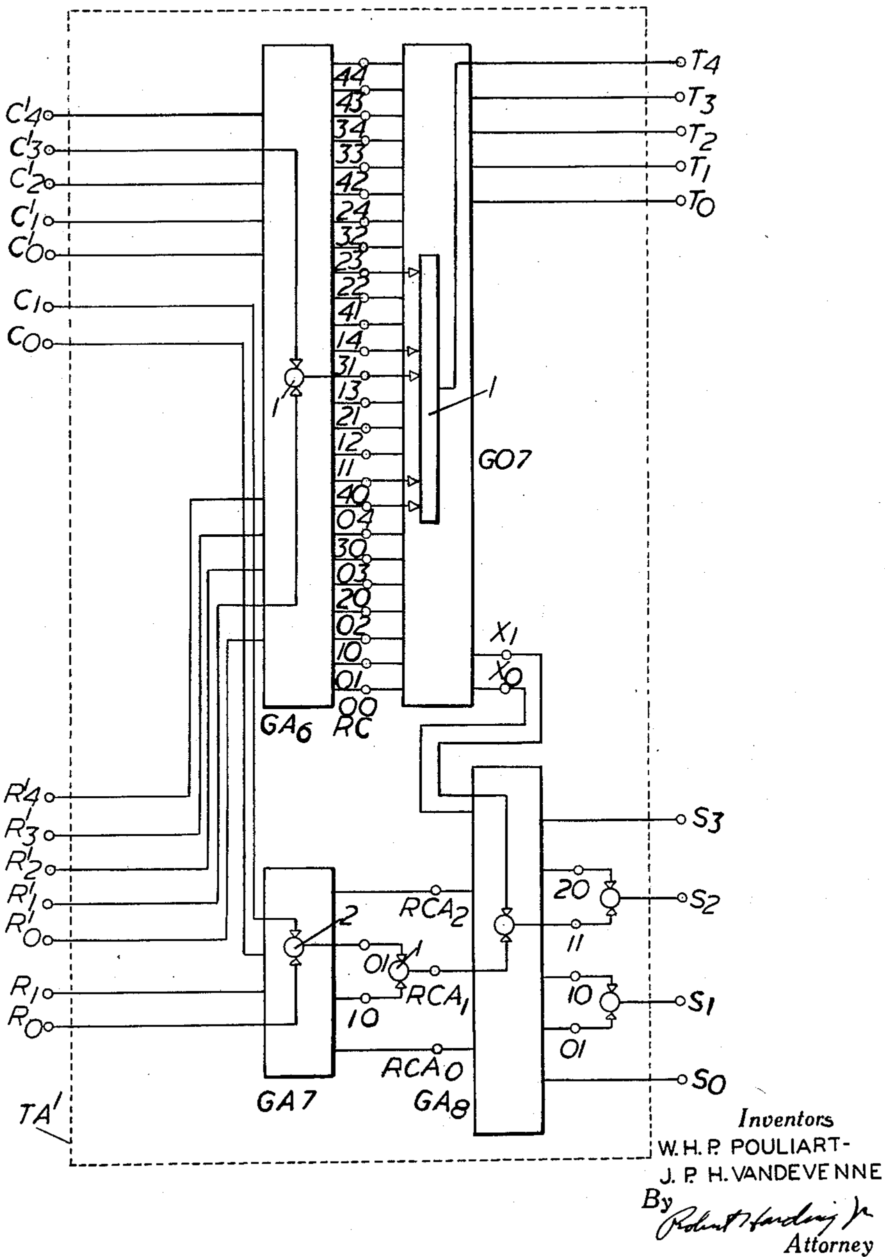

The addition table matrix TA1 is shown in detail at FIG. 7. It comprises a partial addition table matrix GA6, GO7 which operates solely on the qinary parts of the two digits to be added up. The arrangement GA6 comprises a series of 25 coincidence gates and for each gate, an input is connected to one of the terminals R'0/4 and the other input is connected to one of the terminals C'0/4. For instance, the coincidence gate represented has its inputs respectively connected to terminals R'1 and C'3 whereas its output is connected to terminal RC13.

The addition table of FIG. 15 shows the binary digit of the sum whereas the addition table shown at FIG. 16 gives the quinary digit of the sum. For instance, for $R=4$ and $C=3$, the binary part is equal to 1 and the quinary part is equal to 2, which gives indeed 7 as sum. These two tables are but partially filled in because there is of course symmetry with respect to the diagonals 0,0,0,1,1 (FIG. 15) and 0,2,4,1,3 (FIG. 16). For the arrangement shown in GA6 (FIG. 7), there will thus be a signal at terminal RC13 when the quinary parts of R and of C are respectively equal to 1 and 3.

Whereas the terminals T0/4 will permit the identity of the quinary part of the sum, the terminals X0/1 will give the binary part of the latter. These terminals are connected to the input of an arrangement of AND circuits called GA8. Three other inputs, the terminals RCA0/2 are also provided for GA8. These inputs come from an addition arrangement GA7 which is used to add up the binary parts of R and of C. The arrangement GA7 has thus four inputs formed by the terminals R0, R1, C0 and C1. By means of four coincidence gates, such as those shown as connecting R0 to C1, the various possible sums are obtained on the four outputs. Two of these outputs will give the same sum and they are grouped towards terminal RCA1 by means of a buffer circuit. A signal will thus appear at one of the terminals RCA0, RCA1, RCA2 according to whether the binary parts of R and of C are both equal to 0, only one is equal to 0, or both are equal to 1.

The arrangement of AND circuits GA8 will permit the addition of the sum of the binary parts of R and of C, which offers three possibilities, with the carry of the sum of the quinary parts of R and of C which offers only two possibilities. It is clear that there are four possibilities for the sum obtained by GA8 and a signal will thus appear at one of the terminals S0/3 according to the signal combination occurring on the terminals RCA0/2 and X0/1. For instance, if a signal occurs simultaneously on RCA1 and X1, a signal will appear in S2. This signal will thus correspond to a value of $2\times5=10$.

Referring again to FIG. 1, it is seen that the 9 output terminals of TA1 work into the second addition table matrix TA2. This table matrix also receives the quinary part of the units digit of the product and the binary part of the units digit of the product, results which are supplied by the multiplication table matrix TM to the terminals U'0/4 and U0/1. The addition table matrix TA2 has three output groups: the terminals C01/2, C03/8 and W0/2. The terminal arrangement C01/8 will give in binary code the units digit of the final result of the operation $(A\times B)+C+R$. The terminal arrangement W0/2 gives the carry which goes towards the first carry table matrix TR1.

Figure 8:
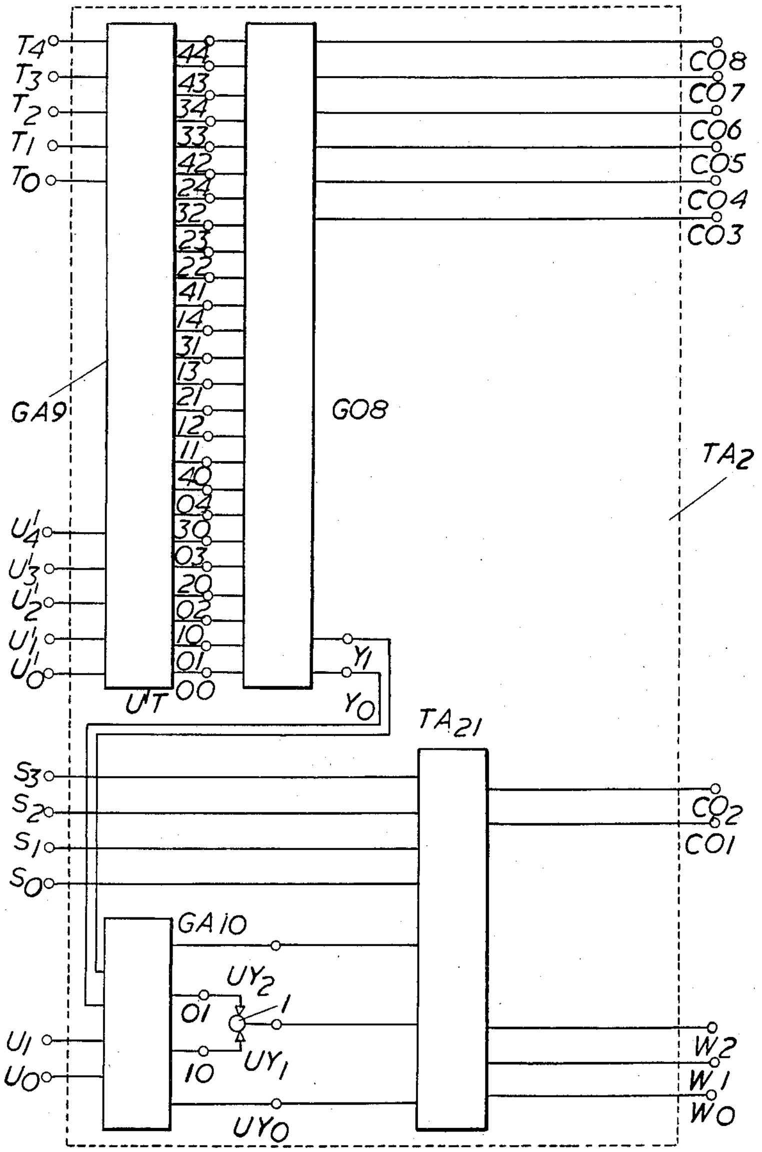

The structure of the second addition table matrix TA2 is represented at FIG. 8. It is seen that the quinary part of the sum of C and of R (T0/4) is added up to the quinary part of the units digit of the product $A\times B$ (U'0/4). The addition is made by means of an AND circuit arrangement GA9 which by means of 25 output terminals U'T00/44 is connected to the OR circuit arrangement GO8. The structure of GA9 is identical to that of GA6 but that of GO8 will be different from that of GO7 because the quinary part of the result given by GO8 is a final result which has to go to the memory. It is thus preferable, as the calculation operations are ended with respect to this result, to come out directly in 3-digit binary code. For this reason, six output terminals C03/8 have been represented. Each of these output terminals will of course form the output of an OR circuit having several inputs which will be connected to various output terminals U'T00/44.

FIGS. 17, 18 and 19 give tables permitting the identification of the digits of the 3-first, second, and third digits, respectively binary code used to represent the quinary part of a sum which is shown in FIG. 16. This takes into consideration the particular code which has been previously described. For instance, if the quinary part of the units digit of the product $A\times B$ is equal to 2 and if the quinary part of the sum $C+R$ is equal to 1, a potential will appear at terminal U'T21 and as is shown on the table of FIG. 16, the entire result is equal to 3. In FIG. 17, if C is equal to 1, it will be represented in the second row of squares, and if R is equal to 2, it will be represented in the third column. Where the second row and third column intersect, a 1 will be found, indicating that the first digit of the three digit code will be 1. FIG. 18 similarly indicates the second digit and FIG. 19 the third digit. Thus, as shown by the tables of FIGS. 17, 18 and 19, 3 will be expressed in the binary code in the form of 101, i.e. GO8 (FIG. 8) will be arranged in such a way that this combination will appear on the terminals C03/8. If the odd terminals correspond to 0, signals will thus appear on the terminals C04, C05 and C08.

The arrangement of GO8 will also give the carry of weight 5 i.e. terminals Y0, Y1 correspond to terminals X0, X1. This carry will be added up to the binary part of the units digit of the product $A\times B$ which also has a weight of 5. This addition will be performed by the arrangement GA10 which will thus be identical to GA7 already explained with relation to FIG. 7. Three output terminals UY0/2 will thus be foreseen.

These three outputs, as well as the four outputs S0/3, which also give signals having a weight of 5, will form the inputs of the partial addition table matrix TA21. This addition table TA21 will have two output groups. The first group C01/2 will give a result equal either to 0, or to 5. The second group W0/2 will give carries of weight 10, i.e. either 0, or 10 or 20. The internal structure of the partial addition table matrix TA21 has not been described because it is evident by virtue of the explanations given previously with respect to other addition table matrices. The signal appearing either on terminal C01 or on terminal C02 will thus indicate the binary part of the units digit of the result of the operation $$(A\times B)+C+R$$

The final result of this operation has now been obtained and only the tens digit of the final result, which will constitute a carry for the subsequent operation, has still to be considered.

The first carry table matrix TR1, shown at FIG. 1, is not only connected to terminals W0/2 which will give either 0, or 10, or 20, but also to terminals D'0/4 leaving the multiplication table matrix TM, and which represent the quinary part of the tens digit of the product $A\times B$. The signal appearing on one of these five terminals will thus have a value of 0, or 10, or 20, or 30, or 40. The carry table matrix TR1 is essentially an addition table of the type previously described and will give a result giving the tens digit of the whole of the operations in a biquinary form. There is thus a pair of output terminals V0/1 on one of which will appear a signal according to whether the total result reaches 50 or not. As far as the quinary part of the final carry digit is concerned, this could be expressed by the appearance of a signal on one out of 5 terminals. However, this carry digit has no longer to undergo operations and has only to go in memeory or in a delay circuit in order to be used for the next operation. Consequently, it is preferable to express it in 3-digit binary code and for this reason six terminals R03/8 have been provided.

The second carry table matrix TR2 will finally permit the adding up of the carry of TR1 which has a weight of 50 to the binary part of the tens digit of the product $A\times B$ which also has a weight of 50. The second carry table TR2 could thus be an addition table matrix of the same type as GA7 (FIG. 7) but as a signal cannot appear simultaneously on D1 and on V1 because the total result of the operation may not exceed 99, two output terminals R01 and R02 will only be provided. A signal on R01 corresponding to the signals appearing simultaneously on terminals D0 and V0 will thus indicate that the binary part of the carry digit is 0. A signal on R02 will indicate that the binary part of the carry digit is equal to 1, i.e. the total result exceeds 49. This signal will appear in accordance with the signals appearing simultaneously either on terminals D0 and V1, or on terminals D1 and V0.

The operation $(A\times B)+C+R$ has thus been completely described. It will be remarked that this basic operation can be used for multiplications of numbers of various digits and will permit a progressive adding up of digits of same rank of the partial products. For adding up numbers of various digits, it will be sufficient to make B equal to 1. For subtractions of numbers of various digits, B will also be equal to 1 and moreover, a complement taking circuit which will be described herebelow will be necessary. All other operations can, as it is well known, be reduced to operations of the type previously described, for instance by using approximation polynomials.

Although this is not part of the invention itself, one will briefly describe how the calculation table matrix, shown at FIG. 1, can be used for a multiplication of two numbers of various digits. These numbers will be registered, according to the binary coding decimal system previously described and by using the particular code which has been mentioned, on memory lines such as those described in U.S. Patent No. 2,649,502 and by using a parallel representation. That is to say, that for each number such as A there, will be four memory lines having as many stages as there are digits in the decimal number. A similar arrangement will be used for the number B, as well as for the number C, which will indicate successively the first partial multiplication product of the multiplicand A by the lowest digit of the multiplier B, the sum of these first two partial products, and so on, to indicate finally the result of the multiplication. For R as it only concerns a carry which is used immediately after the operation on the calculation table matrix which has caused this carry, a simpler memory could be used. That is to say that the carry appearing on four out of the terminals R01/8 could simply be sent in a delay circuit to be directly registered on BSR and RI at the next operation.

The multiplicand A will thus be multiplied by each digit of the multiplier B and the result obtained on the terminals C01/8 will thus be accumulated on the memory lines feeding the flip-flop device BSC and the three other flip-flop devices comprised in the arrangement CI. For a same digit of the multiplier B inscribed on BSB and BI, the digits of the memory lines feeding BSA, AI and BSC, CI will be successively advanced until all digits of the multiplicand A have been multiplied by the digit of the multiplier B, considered by adding the aggregate digit of the partial products having the appropriate rank. All digits of the multiplicand A having filed past to be multiplied by a same digit of the multiplier B, it will be sufficient to have the next digit of B advanced, which will be inscribed on BSB and on BI, whereas, at the same moment, the digits of the memory lines feeding BSC and CI will be made to advance in order to obtain the correct alignment of the digit of the partial products. Of course, as all digits of the multiplicand A are successively used in various passes, the memory lines feeding BSA and AI will be closed on themselves in order not to loose the digits of the multiplicand.

When all digits of the multiplicand A will have been multiplied by all digits of multiplier B by using the calculation table matrix shown at FIG. 1, the result will be inscribed on the memory lines feeding BSC and CI. If it is desired to keep all the digits of this result, it will of course be necessary to add a fourth arrangement of memory lines which will gradually register the less significant digits of the result as they are ejected from the memory lines feeding BSC and CI.

If the operation envisaged is an addition of two numbers of various digits, the operations will be identical to those described above with the exception that 1 will be inscribed on BSB and BI. It will not be necessary to feed otherwise BSB and BI, whereas the two numbers having to be added up will be respectively inscribed on the memory lines feeding BSA, AI and BSC, CI. The various digits of these numbers will file past in synchronism until the final result is obtained on the memory lines feeding BSC and CI.

Figure 10:
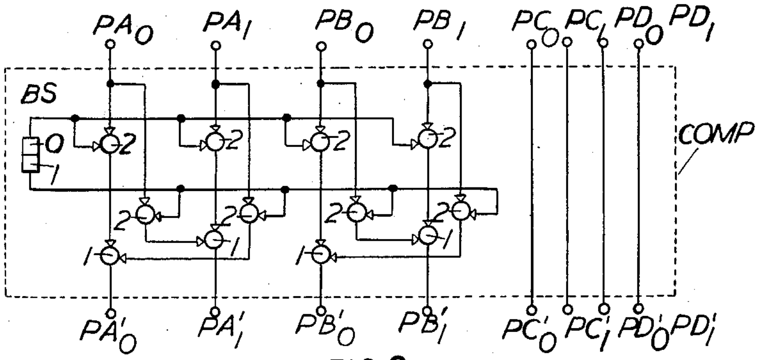

Finally, in case of a subtraction, the operations will be similar to those which have just been described for an addition, but instead of connecting directly the outputs of the flip-flop device BSC to terminals C0 and C1, and connecting directly the outputs of the three other flip-flop devices included in CI to the inputs of the translator also included in CI, these 8 connections will be made by means of a complement taking circuit COMP which is represented at FIG. 10.

The eight input terminals, such as PA0, are connected to the two-input coincidence gates, the outputs of which are connected by means of OR circuits, also with two inputs, to the outputs of COMP, such as PA'0. Besides the gates, circuit COMP comprises a flip-flop device BS with two stable positions. When the latter is in position 0, it is seen that terminal PA0 permits a direct connection to terminal PA'0, also for PA1 to PA'1, PB0 to PB'0 and PB1 to PB'1. Only in case of a subtraction will the flip-flop device BS be brought in its position 1 and in this case a signal on PA0 will be sent to PA'1, and a signal on PA1 will be sent to PA'0. The first of the four digits is thus reversed, as well as the second. In this way, the four signals appearing on terminals C0/1 and C'0/4 (FIG. 1) will represent the complement to 9 of the digit registered on the flip-flop device BSC and on the three other flip-flop devices included in CI.

At the end of the operation of subtraction, the result will not be final. If a 1 remains as final carry, it should be entirely carried into the result considered by again using the calculation table matrix. For instance, if it is desired to subtract 27 from 65, the calculation table matrix will first of all add 72 to 65 which will give as result 37 plus a carry of 1. By adding this carry of 1 to 37, 38 is obtained which is indeed the correct result of the subtraction. If no carry remains after the first operations, it will be sufficient to replace all digits of the result considered by their complement to 0, which can be done by using the complement taking circuit shown at FIG. 10. For instance, if it is desired to subtract 72 from 65, 27 will be added to 65 which will give 92 and no carry. By taking the complement to 9 of the digits of 92, 7 is obtained which is indeed the modulus of the desired result. It is easily seen that the sign of the result is identical to the sign of C when there is no carry, and is contrary to that of C when there is a carry. By the sign of C it is of course understood the sign of the number which has to be subtracted.

Figure 9:
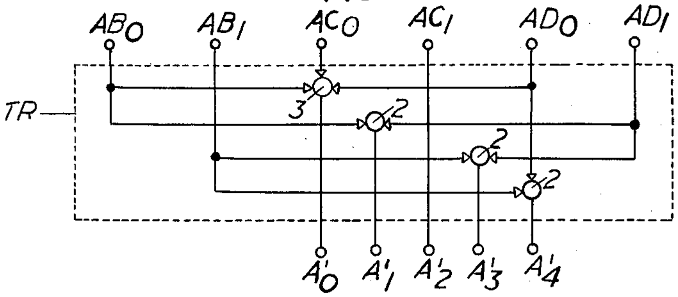

It will be remarked that the translation circuit shown at FIG. 9 uses two-input gates with the exception of one single which has three inputs. Consequently, if selenium rectifiers are used for realizing these gates, the three-input gates could be determinant as far as the capacity of these rectifiers and the parasitic capacities are concerned and could limit the translation speed. To avoid this inconvenience, codes could of course be used such as those defined by FIG. 20 but one can also give a preference to the appearance of signals at terminals AB0, AC0 and AD0 with respect to the three other input terminals. It will be sufficient after the use of a digit to replace the four flip-flop devices BSA, BSA1/3 (FIG. 1) in their position 0 before permitting the memory lines corresponding to these flip-flop devices to be able to supply the new digit to them. In that way, the greatest time constant for the circuits going to terminal A'0 (FIG. 9) will be compensated by the fact that the signals which will supply the signal on A'0, and which correspond to 0 according to the code chosen, will appear before the others.

An electronic embodiment of the calculation table matrix of FIG. 1, using selenium rectifiers, has permitted the use of it at a frequency of 50 kc./s.

While the principles of the invention have been descirbed above in connection with specific apparatus, it is to be clearly understood that this description is made only by way of example and not as a limitation on the scope of the invention.

What we claim is:

1. Electrical computer for calculating the product of two decimal digits A and B, wherein an electrical table matrix is used for obtaining said product by processing said digits in their biquinary form in which each digit has a quinary part of weight 0, 1, 2, 3 or 4 and a binary part of weight 0 or 5, said table matrix comprising input terminals AB0/1, AQ0/4, BB0/1, BQ0/4, AB0/1 signifying two terminals AB0 and AB1 respectively energizable to characterize binary bits 0 and 1 in the binary part of digit A, BB0/1 similarly signifying two input terminals for the binary part of digit B, AQ0/4 signifying five input terminals AQ0, AQ1, AQ2, AQ3 and AQ4 for the quinary part of digit A, and BQ0/4 similarly signifying five input terminals BQ0 to BQ4 for the quinary part of digit B, means for applying electrical signals to said input terminals respectively characterizing the quinary and binary parts of digits A and B, first gating means for determining which single pair of terminals AK0/4 and BQ0/4 is energised and delivering an output signal characterizing the value of the quinary part of the units digit of the product, second gating means for determining which single pair, if any, of terminals AK0/4 and BQ0/4 is energised while simultaneously terminals AB1 and BB1 are both energised and delivering an output signal characterizing the value of the tens digit of the product as well as the value of the binary part of the units digit of the product, third gating means for delivering an output signal if the set of terminals AB0AQ0BB1 or BB0BQ0AB1 is energised, said output signal indicating that the values of the tens digit and of the binary part of the units digit are both zero, fourth gating means for delivering an output signal if the set of terminals AB0AQ1BB1 or BB0BQ1AB1 is energised, said output signal indicating that the values of the tens digit and of the binary part of the units digit are respectively equal to zero and one, fifth gating means for delivering an output signal if the set of terminals AB0AQ2BB1 or BB0BQ2AB1 is energised, said output signal indicating that the value of the tens digit of the product is one, sixth gating means for delivering an output signal if the set of terminals AB0AQ3BB1 or BB0BQ3AB1 is energised, seventh gating means for delivering an output signal if the set of terminals AB0AQ4BB1 or BB0BQ4AB1 is energised, eighth gating means for delivering an output signal if the pair of terminals AB0BB0 is energised, ninth gating means for delivering an output signal if one of the pairs of terminals AQ3BQ4 or AQ4BQ3 or AQ4BQ4 is energised, tenth gating means for delivering an output signal if one of the pairs of terminals AQ2BQ3 or AQ3BQ2 or AQ2BQ4 or AQ4BQ2 or AQ3BQ3 or AQ4BQ4 is energised, eleventh gating means for delivering an output signal if one of the pairs of terminals AQ0BQ3 or AQ3BQ0 or AQ1BQ3 or AQ3BQ1 is energised, twelfth gating means for determining if an output signal from said fifth gating means is accompanied or not by an output signal from said tenth gating means and for delivering an output signal characterizing the value of the binary part of the units digit, i.e. one or zero, thirteenth gating means for determining if an output signal from said sixth gating means is accompanied or not by an output signal from said tenth gating means and for delivering an output signal characterizing the value of the binary part of the units digit i.e. zero or one, fourteenth gating means for determining if an output signal from said seventh gating means is accompanied or not by an output signal from said tenth gating means and for delivering an output signal characterizing the value of the binary part of the units digit, i.e. one or zero, fifteenth gating means for determining if an output signal from said eighth gating means is accompanied or not by an output signal from said tenth gating means and for delivering an output signal characterizing the value of the binary part of the units digit, i.e. one or zero, sixteenth gating means for determining if an output signal from said sixth gating means is accompanied or not by an output signal from said eleventh gating means and for delivering an output signal characterizing the value of the tens digit, i.e. one or two, seventeenth gating means for determining if an output signal from said seventh gating means is accompanied or not by an output signal from said ninth gating means and for delivering an output signal characterizing the value of the tens digit, i.e. three or two, and eighteenth gating means for determining if an output signal from said eighth gating means is accompanied or not by an output signal from said ninth gating means and for delivering an output signal characterizing the value of the tens digit, i.e. one or zero.

2. In an electrical computer, a static multiplication matrix to process two factor digits in their biquinary form and obtain their product, said matrix comprising two sets of quinary part input terminals for the quinary parts of the respective factor digits and two sets of binary part input terminals for the binary parts of the respective factor digits, means for applying electrical signals to the sets of input terminals to characterize the binary and quinary parts of the two factor digits to be multiplied, a first group of gates responsive to concurrence of signals only on the two sets of quinary part input terminals, a second group of gates responsive to combinations of concurrent signals on the four sets of binary and quinary part input terminals, gating means controlled solely by said first group of gates for issuing selective output signals representing the quinary part of the last digit of the product, comparison gating between outputs of the first and second groups of gates, and additional gating means controlled by the outputs of the second group of gates and by said comparison gating for issuing output signals representing the binary part of the last digit and the quinary and binary parts of the first digit of the product.

(References on following page)

References Cited in the file of this patent

UNITED STATES PATENTS

| | | |
|---|---|---|
| 2,428,812 | Rajchman | Oct. 14, 1947 |
| 2,538,636 | Williams | Jan. 16, 1951 |
| 2,625,328 | Cesareo | Jan. 13, 1953 |
| 2,668,661 | Stibitz | Feb. 9, 1954 |
| 2,693,593 | Crosman | Nov. 2, 1954 |
| 2,884,192 | Dickinson | Apr. 28, 1959 |

OTHER REFERENCES

"Description of a Magnetic Drum Calculator," Harvard Univ. (1), Aug. 22, 1952, pages 100–114 relied on.

Richards, "Arithmetic Operations in Digital Computers," D. Van Nostrand Co., first printing February 1955, pages 91, 225, 226, 227, 263, 264, 265, 266.